(12) United States Patent
McIlvaine et al.

(10) Patent No.: US 7,152,155 B2
(45) Date of Patent: Dec. 19, 2006

(54) SYSTEM AND METHOD OF CORRECTING A BRANCH MISPREDICTION

(75) Inventors: Michael Scott McIlvaine, Raleigh, NC (US); James Norris Dieffenderfer, Apex, NC (US); Jeffrey Todd Bridges, Raleigh, NC (US); Thomas Andrew Sartorius, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 156 days.

(21) Appl. No.: 11/061,981

(22) Filed: Feb. 18, 2005

(65) Prior Publication Data

US 2006/0190707 A1 Aug. 24, 2006

(51) Int. Cl.
*G06F 9/38* (2006.01)
(52) U.S. Cl. .................... 712/239; 712/219
(58) Field of Classification Search ............ 712/23, 712/24, 233, 234, 235, 236, 237, 238, 239, 712/240, 219
See application file for complete search history.

(56) References Cited

U.S. PATENT DOCUMENTS

| | | | |
|---|---|---|---|
| 5,511,175 A * | 4/1996 | Favor et al. ................ 712/216 |
| 5,561,776 A * | 10/1996 | Popescu et al. ............ 712/239 |
| 5,584,009 A | 12/1996 | Garibay, Jr. et al. |
| 5,812,839 A * | 9/1998 | Hoyt et al. ................. 712/239 |
| 5,978,909 A * | 11/1999 | Lempel ...................... 712/240 |
| 6,205,542 B1 | 3/2001 | Grochowski et al. |
| 2004/0187119 A1 | 9/2004 | Janik et al. |

* cited by examiner

*Primary Examiner*—William M. Treat
(74) *Attorney, Agent, or Firm*—Nicholas J. Pauley; Philip R. Wadsworth; Charles D. Brown

(57) ABSTRACT

When a branch misprediction in a pipelined processor is discovered, if the mispredicted branch instruction is not the last uncommitted instruction in the pipelines, older uncommitted instructions are checked for dependency on a long latency operation. If one is discovered, all uncommitted instructions are flushed from the pipelines without waiting for the dependency to be resolved. The branch prediction is corrected, and the branch instruction and all flushed instructions older than the branch instruction are re-fetched and executed.

17 Claims, 3 Drawing Sheets

SYSTEM AND METHOD OF CORRECTING A BRANCH MISPREDICTION

BACKGROUND

The present invention relates generally to the field of processors and in particular to a method of flushing uncommitted instructions from a processor execution pipeline in response to a branch misprediction.

Microprocessors perform computational tasks in a wide variety of applications. Improved processor performance is almost always desirable, to allow for faster operation and/or increased functionality through software changes. In many embedded applications, such as portable electronic devices, conserving power is also an important consideration in processor design and implementation.

Most modern processors employ a pipelined architecture, where sequential instructions, each having multiple execution steps, are overlapped in execution. For maximum performance, the instructions should flow through continuously through the pipeline. However, instructions often become stalled in the pipeline for a variety of reasons, such as data dependencies between instructions, delays associated with memory accesses, an inability to allocate sufficient pipeline resources to instructions, and the like. Minimizing pipeline stalls and resolving them efficiently are important factors in achieving improved processor performance.

Real-world programs include conditional branch instructions, the actual branching behavior of which is commonly not known until the instruction is evaluated deep in the pipeline. Commonly modern processors employ various forms of branch prediction, whereby the branching behavior of conditional branch instructions is predicted early in the pipeline, and the processor speculatively allocates pipeline resources, and/or fetches and speculatively executes instructions, based on the branch prediction. When the actual branch behavior is determined, if the branch was mispredicted, the speculatively fetched instructions must be flushed from the pipeline, and new instructions fetched from the correct branch target address. Mispredicted branches adversely impact processor performance and power consumption.

Commonly, in handling a mispredicted branch instruction, all instructions older than the branch instruction—that is, the instructions that entered the pipeline ahead of the branch instruction—are allowed to complete execution before the speculatively fetched instructions are flushed. Where one or more of the older instructions is stalled in the pipeline due to a long latency operation, waiting for the dependency to be resolved before flushing the pipeline exacerbates the mispredicted branch performance penalty.

SUMMARY

The present invention relates to a method of handling a branch misprediction in a pipelined processor. A branch misprediction is detected, and at least one instruction older than the branch instruction is flushed from the pipeline, in response to detecting the misprediction.

The present invention also relates to a processor. The processor includes an instruction execution pipeline, and a branch predictor predicting the evaluation in the pipeline of conditional branch instructions. The processor also includes an instruction order manager tracking the order of, and dependencies between, instructions in the pipeline. The processor additionally includes a pipeline controller flushing at least one instruction older than a branch instruction from the pipeline, in response to detecting that the branch instruction was mispredicted.

In addition, the present invention relates to a method of correcting a branch misprediction in a pipelined processor. A branch instruction misprediction is detected. Whether the branch instruction is the last uncommitted instruction in the pipelines determined. If the branch instruction is the last uncommitted instruction in the pipelines, the branch instruction is committed and all uncommitted instructions are flushed from the pipelines. If the branch instruction is not the last uncommitted instruction in the pipelines, whether an instruction older than the branch instruction is stalled in a pipeline due to a long latency operation is determined. If an instruction older than the branch instruction is stalled in a pipeline due to a long latency operation, the branch instruction and all other uncommitted instructions are flushed from the pipelines.

DETAILED DESCRIPTION

Figure 1:
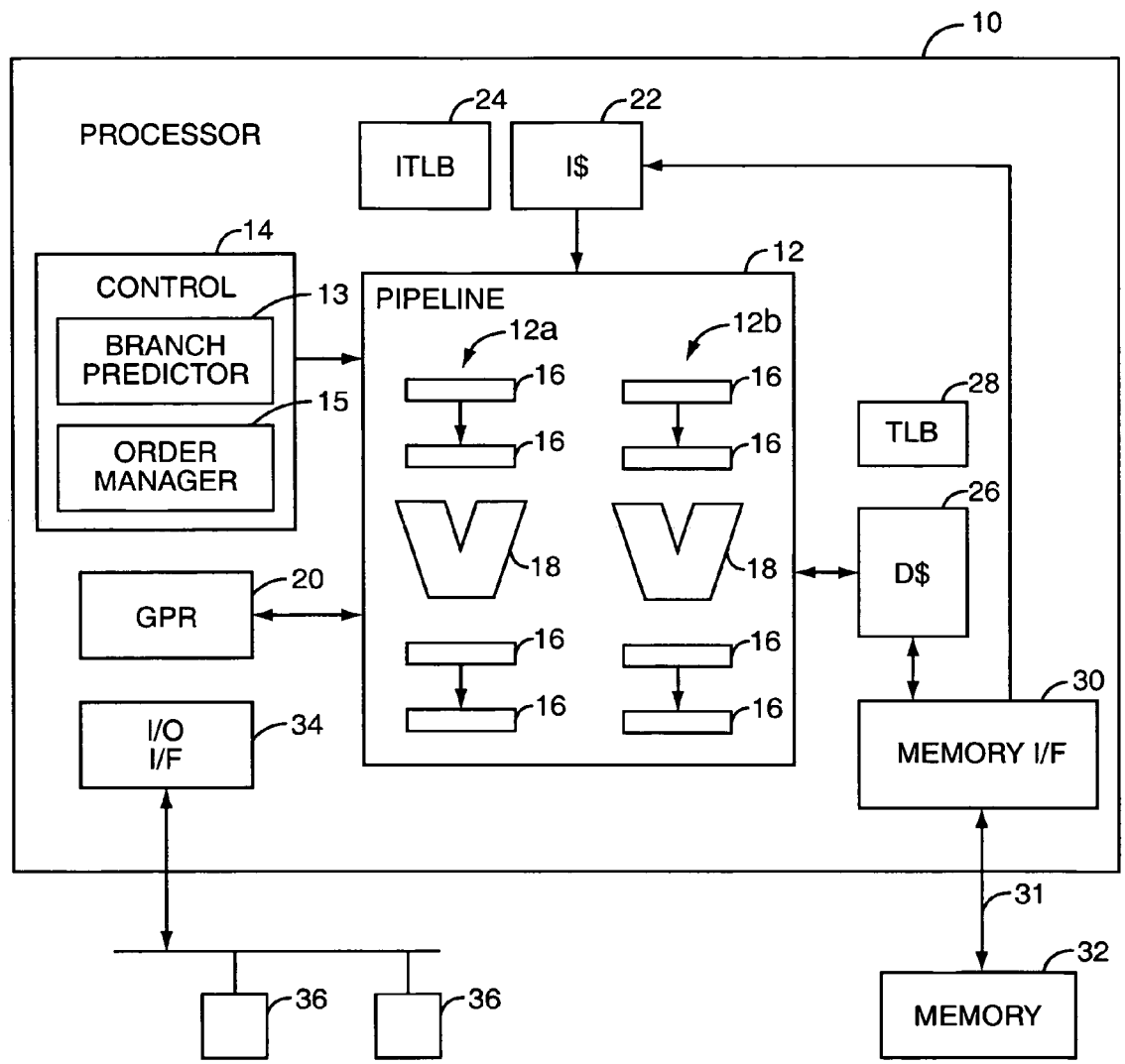
FIG. 1 is a functional block diagram of a processor.

FIG. 1 depicts a functional block diagram of a processor 10. The processor 10 executes instructions in an instruction execution pipeline 12 according to control logic 14. The pipeline 12 may be a superscalar design, with multiple parallel pipelines such as 12a and 12b. The pipeline control logic 14 may include a branch predictor 13 and an instruction order manager 15. The pipelines 12a, 12b include various registers or latches 16, organized in pipe stages, and one or more Arithmetic Logic Units (ALU) 18. A General Purpose Register (GPR) file 20 provides registers comprising the top of the memory hierarchy. The pipelines 12a, 12b fetch instructions from an Instruction Cache 22, with memory addressing and permissions managed by an Instruction-side Translation Lookaside Buffer (ITLB) 24. Data is accessed from a Data Cache 26, with memory addressing and permissions managed by a main Translation Lookaside Buffer (TLB) 28. In various embodiments, the ITLB may comprise a copy of part of the TLB. Alternatively, the ITLB and TLB may be integrated. Similarly, in various embodiments of the processor 10, the I-cache 22 and D-cache 26 may be integrated, or unified. Misses in the I-cache 22 and/or the D-cache 26 cause an access to main (off-chip) memory 32, under the control of a memory interface 30. The processor 10 may include an Input/Output (I/O) interface 34, controlling access to various peripheral devices 36. Those of skill in the art will recognize that numerous variations of the processor 10 are possible. For example, the processor 10 may include a second-level (L2) cache for either or both the I and D caches. In addition, one or more of the functional blocks depicted in the processor 10 may be omitted from a particular embodiment.

Pipelining is a well-known processor implementation technique whereby multiple instructions are simultaneously overlapped in execution. Each instruction in a typical architecture is executed in a plurality of execution steps, such as Fetch, Decode, Execute, Memory Access, and Write-Back. A processor pipeline 12 consists of a plurality of "pipe stages," each comprising logic and a storage element 16, which completes an execution step or part of an execution step of an instruction. The pipe stages are connected together to form a pipeline 12. Instructions enter the pipeline 12 and are successively processed through the stages. New instructions enter the pipeline 12 before previous instructions complete execution—hence, multiple instructions may be processed within the pipeline 12 at any given time. This ability to exploit parallelism among instructions in a sequential instruction stream contributes significantly to improved processor performance. Under ideal conditions and in a processor 10 that completes each pipe stage in one cycle, following the brief initial process of filling the pipeline 12, an instruction may complete execution every cycle.

Such ideal conditions are never realized in practice, due to a variety of factors including data dependencies among instructions (data hazards), control dependencies such as branches (control hazards), processor resource allocation conflicts (structural hazards), interrupts, cache misses, page faults and the like. A typical data hazard is encountered when an instruction performs an arithmetic or logical operation on two operands, where one or more of the operands is the result of a preceding instruction that has not completed execution and hence has not generated the required operand. The older instruction may be another arithmetic or logical operation, or it may be a memory access, such as one that misses in a cache 22, 26, forcing the memory interface 30 to perform an off-chip memory access operation. A data hazard forces the pipeline 12 to stall.

A typical control hazard encountered in pipelined processors 10 is a mispredicted branch instruction. Conditional branch instructions are either "taken," wherein the instruction directs control flow to a different program point, or "not taken," wherein instruction execution proceeds sequentially. The evaluation of the branch condition occurs deep in a pipeline 12, during an execute pipe stage. Until the branch instruction is evaluated, the processor 10 does not know which instruction to fetch and execute next (i.e., the next sequential instruction or the instruction at a branch target address). The delay in waiting until the branch condition is evaluated causes a stall in the pipeline 12. Accordingly, many processors predict how a branch condition will evaluate, for example based on prior execution of the conditional branch instruction. The processor 10 fetches instructions into the pipeline 12 beginning at the predicted address, speculatively executing the instructions. When the prediction is correct, a pipeline stall is avoided.

Some branch instructions will evaluate a branch condition opposite to that which was predicted. This is referred herein as a "branch misprediction" or a "mispredicted branch." When a branch misprediction is detected, all instruction newer than the branch instruction (i.e., all instructions fetched based on the branch prediction) must be flushed from the pipeline 12. In a single pipeline, determining which instructions are newer than the mispredicted branch is straightforward—all pipe stages "behind" the branch must be flushed.

Figure 2:
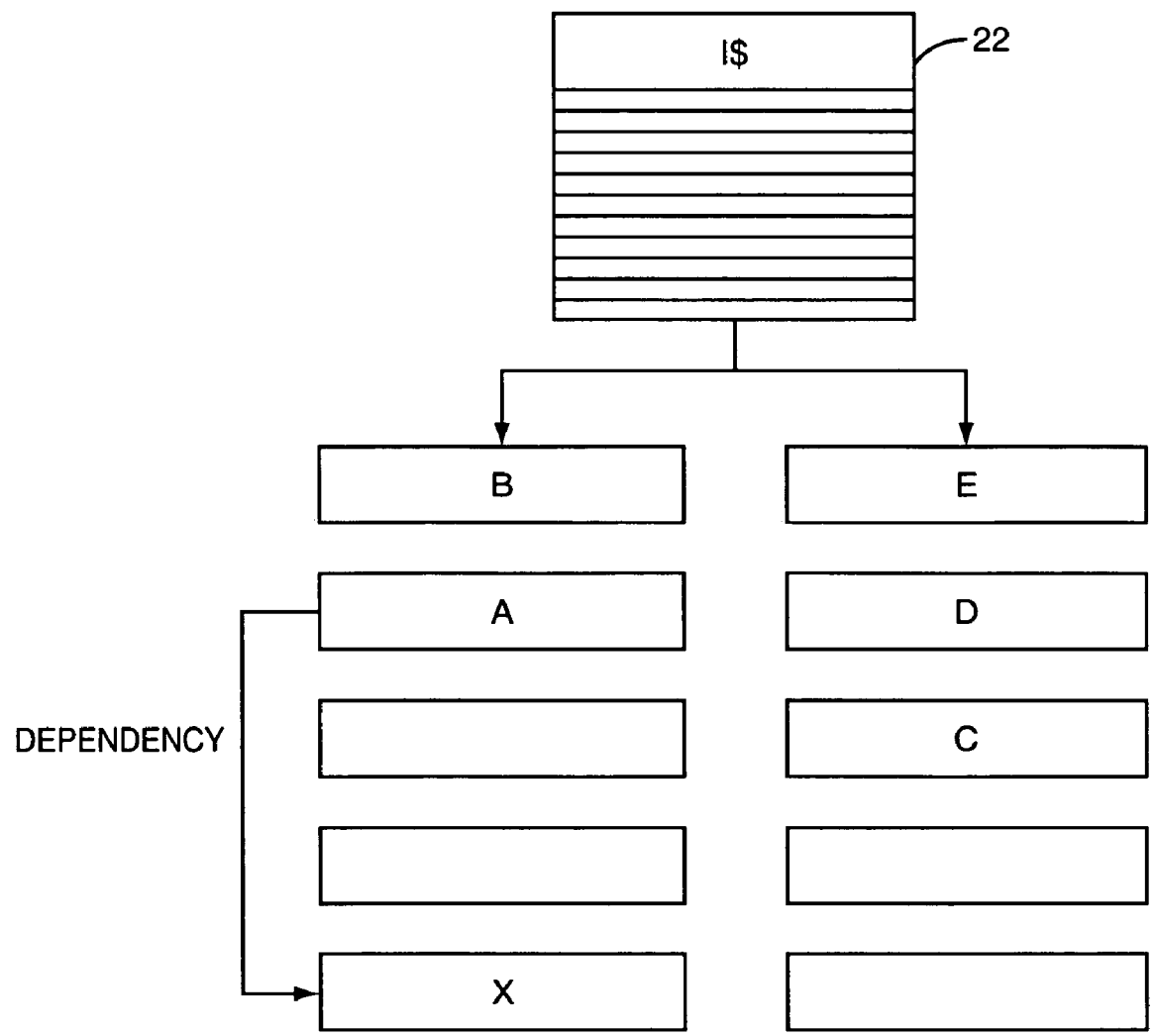
FIG. 2 is a functional block diagram of an instruction cache and parts of two pipelines.

FIG. 2 depicts a superscalar pipeline architecture, with two parallel execution pipelines 12a and 12b. In the situation depicted in FIG. 2, instruction A in pipeline 12a is stalled due to a dependency on instruction X, such as operand generation, a memory access, or some other long latency operation. Instruction A's data hazard has also stalled instruction B. Accordingly, instructions C, D and E have been fetched from the instruction cache 22 and loaded into pipeline 12b. In a superscalar processor 10, some mechanism is necessary for tracking the order of instruction execution, as well as tracking dependencies between instructions.

Most superscalar processors 10 include an order manager 15 as part of the pipeline control logic 14. The order manager 15 tracks the order of instruction execution through the pipeline—that is, which instructions are older or newer than a given instruction. The order manager 15 additionally tracks instruction dependencies, and is instrumental in exception handling.

An exception or interrupt occurs whenever a pipe stage is unable to complete its execution of an instruction step. For example, a store instruction writing data to memory may cause an exception if a TLB 28 look-up indicates that the memory page is read-only. Other types of exceptions are well known in the art. Upon encountering an exception, the processor 10 must execute all prior, or older, instructions in the pipeline 12 (or pipelines 12a and 12b in a superscalar architecture); flush the exception-causing instruction and all newer instructions from the pipelines 12a and 12b; and then fetch and execute interrupt-handling code. The order manager 15 assists in this process by tracking which instructions are "confirmed" and which are "committed."

An instruction is confirmed when it is determined that no pipeline hazards will impede its execution—that is, the instruction will not stall. For example, an instruction performing an arithmetic or logical operation may be confirmed when both operands are known to have been generated from previous instructions, fetched from memory, or are otherwise available.

An instruction is committed when that instruction, and all older instructions, are confirmed. A committed instruction is known to be able to complete execution, as no pipeline hazards impede either it (the instruction itself is confirmed) or any instruction ahead of it (all older instructions are confirmed). Referring to FIG. 2, instruction A is not confirmed, due to its dependency on the results of instruction X. Instruction B is unlikely to be confirmed at such an early stage in the pipeline 12a. Instruction C in pipeline 12b may be confirmed, meaning that no hazards preclude instruction C from completing execution. Instruction C cannot be committed, however, until all instructions older that it—i.e., instructions A and B—are confirmed.

The conventional rule during exception handling is that the pipelines 12a and 12b are flushed when the exception-causing instruction is the "last uncommitted instruction." For example, if instruction D were to generate an exception, the dependency of instruction A on instruction X must be resolved, allowing A to confirm. Once A confirms, if there are no unconfirmed instructions ahead of A (assume instruction X completes), it will also be committed. If instruction B also confirms and commits as it proceeds through the pipeline 12A, instruction C will then be committed, as instructions A, B and C are confirmed. D is then the last uncommitted instruction, and will be flushed, along with all newer instructions (e.g., E), from the pipelines 12a and 12b. The exception-handling instructions are then fetched and fed into the pipelines 12a and 12b, as the committed instructions A, B and C proceed through the pipeline and complete execution. By forcing the exception-causing instruction to be the last uncommitted instruction in the pipelines 12a and 12b, a clean break in the program execution is ensured. That is, once the interrupt-handling instructions resolve the error and restore the state of the processor 10, program execution may resume, beginning with instruction D, and will generate correct results.

A similar procedure would seem to be applicable to handle mispredicted branches in a superscalar processor 10. For example, assume that instruction C in FIG. 2 is a conditional branch instruction that has evaluated its branch condition and discovered that it was mispredicted. Instructions D and E were fetched based on the erroneous branch prediction, and must be flushed from the pipeline 12b and replaced with instructions fetched from the correct branch target address. Under the exception-handling rule, the mispredicted branch C would wait until it was the last uncommitted instruction—that is, until the dependence of A on X was resolved and A and B confirmed and committed—before flushing D and E. However, the dependency of A on X may require some time to resolve, delaying the time until the proper next instruction following the mispredicted branch C is fetched and executed. Additionally, if A and B were flushed along with D and E and re-fetched, by the time A proceeds again through the pipeline 12a, the dependency may be resolved, allowing A to confirm immediately.

According to one embodiment of the present invention, and described with reference to FIG. 3, when a mispredicted branch is detected (block 40), if the mispredicted branch is not the oldest uncommitted instruction (block 42), older uncommitted instructions are checked for stalls (block 44). If a stalled instruction is detected, such as due to a pipeline hazard, memory access, or other long latency operation, then the pipeline controller 14 immediately flushes all uncommitted instructions from the pipelines 12a, 12b (block 46). This includes the mispredicted branch, all uncommitted instructions older than the mispredicted branch, and all instructions newer than the branch (i.e., those speculatively fetched based on the branch misprediction). The branch prediction is reversed (block 48), and the flushed, uncommitted instructions are then re-fetched and executed in order (block 50). The long latency operation causing the stall may be resolved by the time the previously stalled instruction is re-fetched and re-executed. Even if it is not, however, the processor is fetching instructions from the correct branch target, and need not wait for the stall to be resolved before doing so, thus improving processor performance.

If the mispredicted branch instruction is the oldest uncommitted instruction (block 42), then the processor commits the mispredicted branch instruction (so as not to flush it), and flushes all uncommitted instructions from the pipelines 12a, 12b (block 52). This flushes all the instructions newer than the mispredicted branch instruction—i.e., those on the erroneously predicted branch path. The branch prediction is then corrected (block 48) so that the branch prediction mechanism accurately reflects the branch evaluation, and instruction fetching and execution continues at the proper branch target address (block 50).

Figure 3:
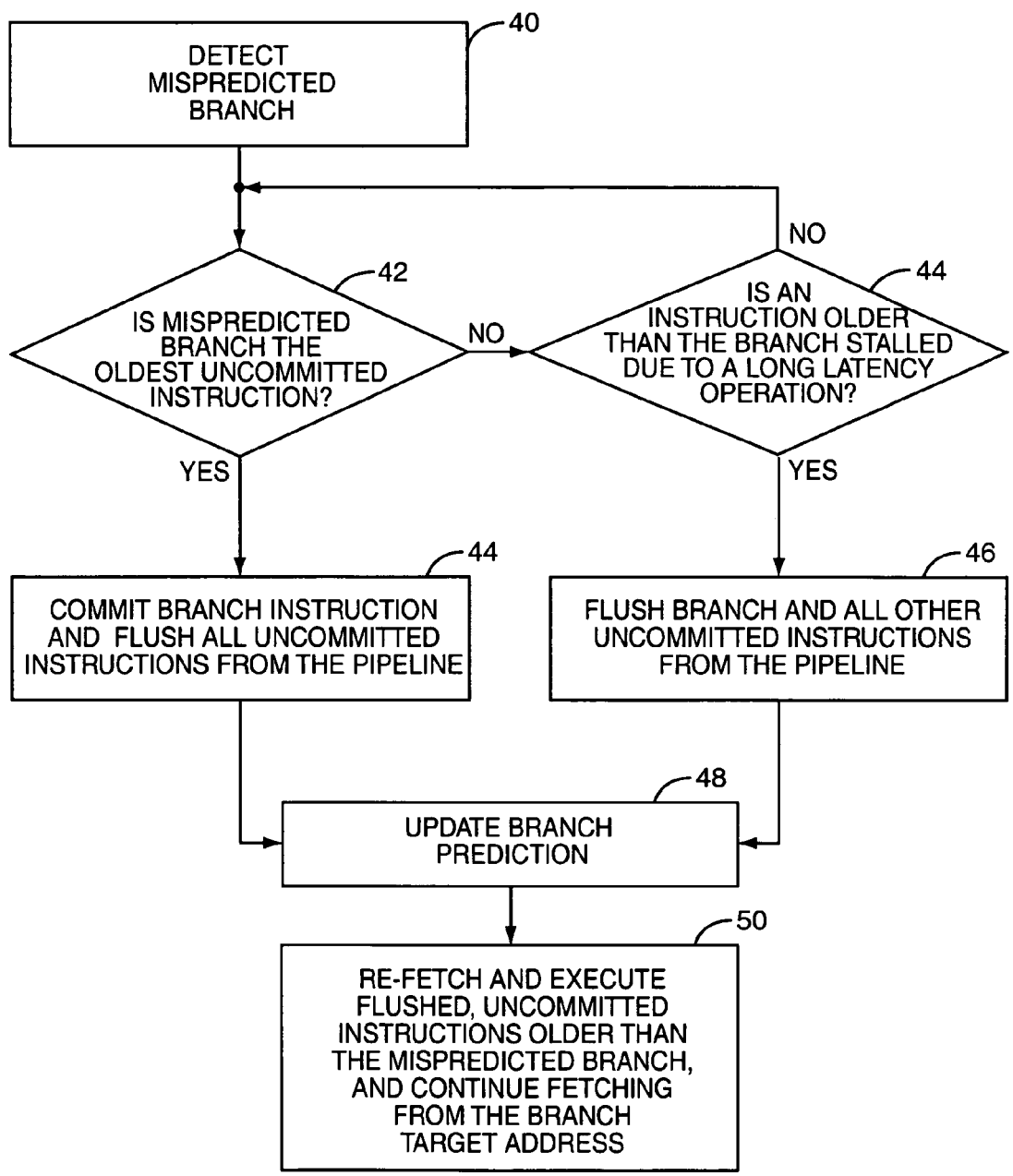
FIG. 3 is a flow diagram of a method of handling a branch misprediction.

As FIG. 3 indicates, if a mispredicted branch (block 40) is not the oldest uncommitted instruction (block 42), and no older, uncommitted instruction is stalled due to a long latency operation, the processor may simply wait for all older instructions to commit (block 42) prior to committing the mispredicted branch and flushing all newer instructions (block 52). This process may take advantage of control logic that already exists for handling exceptions, as discussed above (with the exception of committing the branch, rather than flushing it).

Alternatively, the processor may simply flush all uncommitted instructions (block 46), including the mispredicted branch, and proceed as in the case where an uncommitted instruction was stalled (blocks 48, 50). The latter option (not shown in FIG. 3, but in which the YES path would be the only control flow exiting block 44) may optimize performance, at the cost of control complexity. In the case of a stalled instruction (block 44), the committing of new instructions is paused, and synchronizing the tasks of committing new instructions and flushing uncommitted instructions is simplified. Those of skill in the art will readily recognize that either option is possible, and will yield a correct result.

Conventional processor design practice is to execute all instructions older than an exception-causing instruction, mispredicted branch, or other instruction that prompts a pipeline flush. According to an exemplary embodiment of the present invention, one or more instructions older than a mispredicted branch instruction is flushed from the pipeline, re-fetched and executed. This may improve processor performance and power consumption by promptly terminating the fetching of instructions from an incorrect (mispredicted) address, and constructively utilizing the latency of a pipeline hazard to correct the misprediction. Where the time to resolve the pipeline hazard is equal to or greater than the time required to flush and re-fetch the stalled instruction, recovery from the misprediction incurs no performance penalty.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of handling a branch misprediction in a pipelined processor, comprising:
   detecting that a branch instruction was mispredicted; and
   flushing at least one instruction older than said branch instruction from the pipelines, in response to detecting said misprediction.

2. The method of claim 1 wherein said at least one instruction older than said branch instruction is uncommitted.

3. The method of claim 2 wherein said at least one uncommitted instruction is stalled in a pipeline.

4. The method of claim 1 further comprising:
   correcting said branch prediction; and
   flushing said branch instruction from the pipelines.

5. The method of claim 4 further comprising fetching, in program order, said branch instruction and all flushed instructions older than said branch instruction.

6. The method of claim 1 wherein flushing at least one instruction older than said branch instruction from the pipelines comprises flushing all uncommitted instructions from the pipelines.

7. A processor, comprising:
   at least one instruction execution pipeline;
   a branch predictor predicting the evaluation in the pipelines of conditional branch instructions;
   an instruction order manager tracking the order of instructions in the pipelines; and
   a pipeline controller flushing at least one instruction older than a branch instruction from the pipelines, in response to detecting that said branch instruction was mispredicted.

8. The processor of claim 7 wherein said branch predictor reverses a branch prediction in response to detecting that said branch instruction was mispredicted.

9. The processor of claim 7 wherein flushing at least one instruction older than a branch instruction from the pipelines comprises flushing all uncommitted instructions from the pipelines.

10. The processor of claim 7 further comprising flushing said branch instruction from the pipelines, in response to detecting that said branch instruction was mispredicted.

11. The processor of claim 7 further comprising fetching, in program order, said branch instruction and all flushed instructions older than said branch instruction.

12. A method of correcting a branch misprediction in a pipelined processor, comprising:
   detecting that a branch instruction was mispredicted;
   detecting a dependency of a first instruction older than said branch instruction on a long latency operation; and
   flushing all uncommitted instructions from the pipelines.

13. The method of claim 12 further comprising correcting said branch misprediction.

14. The method of claim 13 further comprising fetching, in program order, said branch instruction and all flushed instructions older than said branch instruction.

15. A method of correcting a branch misprediction in a pipelined processor, comprising:
   detecting that a branch instruction was mispredicted;
   determining whether said branch instruction is the last uncommitted instruction in the pipelines;
   if said branch instruction is the last uncommitted instruction in the pipelines, committing said branch instruction and flushing all uncommitted instructions from the pipelines;
   if said branch instruction is not the last uncommitted instruction in the pipelines, determining if an instruction older than said branch instruction is stalled in a pipeline due to a long latency operation;
   if an instruction older than said branch instruction is stalled in a pipeline due to a long latency operation, flushing said branch instruction and all other uncommitted instructions from the pipelines.

16. The method of claim 15 further comprising correcting said branch misprediction.

17. The method of claim 15 further comprising fetching, in program order, said branch instruction and all flushed instructions older than said branch instruction.

* * * * *